(12) United States Patent
Ozawa et al.

(10) Patent No.: US 6,515,083 B2
(45) Date of Patent: Feb. 4, 2003

(54) PROCESS FOR PRODUCING ISOBUTYLENE BLOCK COPOLYMER

(75) Inventors: Shinji Ozawa, Kyoto (JP); Toshinobu Nakata, Kobe (JP); Tomoki Hiiro, Akashi (JP); Taizo Aoyama, Takasago (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/788,525

(22) Filed: Feb. 21, 2001

(65) Prior Publication Data

US 2002/0082354 A1 Jun. 27, 2002

Related U.S. Application Data

(63) Continuation-in-part of application No. 09/287,123, filed on Apr. 7, 1999, now abandoned.

(30) Foreign Application Priority Data

Apr. 7, 1998 (JP) ............................................ 10-094472
Mar. 29, 1999 (JP) ............................................ 11-086696

(51) Int. Cl.$^7$ ............................................. C08F 297/00
(52) U.S. Cl. ............................ 526/79; 526/89; 526/90; 526/131; 526/206; 526/217; 526/348.7
(58) Field of Search ................................ 525/262, 266, 525/267; 526/79, 89, 90, 131, 206, 217, 348.7

(56) References Cited

U.S. PATENT DOCUMENTS

| 4,347,340 A | * | 8/1982 | Giusti | ......................... 525/249 |
| 5,169,914 A | * | 12/1992 | Kaszas et al. | ............... 526/135 |
| 5,777,037 A | * | 7/1998 | Yamanaka et al. | .......... 528/288 |

FOREIGN PATENT DOCUMENTS

| EP | 0397081 | * | 11/1990 |
| EP | 949282 | * | 10/1999 |
| WO | WO 94/19380 | * | 9/1994 |

* cited by examiner

*Primary Examiner*—Jeffrey Mullis
(74) *Attorney, Agent, or Firm*—Connolly Bove Lodge & Hutz LLP

(57) ABSTRACT

A process for producing an isobutylene block copolymer, which comprises performing cationic polymerization of a monomer component containing isobutylene as a major monomer and a monomer component whose major monomer is not isobutylene in the presence of an initiator, wherein the polymerization is carried out in a mixed solvent containing a monohalogenated hydrocarbon solvent and a non-halogenated hydrocarbon solvent the monohalogenated hydrocarbon solvent containing a primary monohalogenated hydrocarbon having three to eight carbon atoms and/or a secondary monohalogenated hydrocarbon having three to eight carbon atoms, the non-halogenated hydrocarbon solvent containing an aliphatic hydrocarbon and/or an aromatic hydrocarbon.

20 Claims, No Drawings

PROCESS FOR PRODUCING ISOBUTYLENE BLOCK COPOLYMER

CROSS REFERENCE TO RELATED APPLICATION

This application is a continuation-in-part of a prior application Ser. No. 09/287,123 filed Apr. 7, 1999, now abandoned, and entitled "Process for Producing Isobutylene Block Copolymer" disclosure of which is incorporated herein by reference.

FIELD OF THE INVENTION

The present invention relates to a process for producing an isobutylene block copolymer. More particuarly, the present invention relates to a process for producing an isobutylene block copolymer by polymerizing a monomer component containing isobutylene as a major monomer and a monomer component whose major monomer is not isobutylene, which process is characterized by use of a specific mixed solvent which has an advantage in industrial handling over prior art solvents, thereby producing a block copolymer giving excellent performances.

BACKGROUND OF THE INVENTION

It is known in the art to produce an isobutylene block copolymer composed of a polymer block comprising isobutylene and a polymer block comprising an aromatic vinyl monomer by cationic polymerization of isobutylene and an aromatic vinyl monomer such as styrene. For example, U.S. Pat. No. 4,946,899 discloses a process for producing an isobutylene block copolymer in a mixed solvent composed of a combination of methyl chloride and methylcyclohexane. Also, Japanese Examined Patent Publication No. 7-59601/1995 discloses a process for producing a block copolymer from isobutylene and styrene in a mixed solvent containing methylene chloride and hexane.

In these manners, a halogenated hydrocarbon having one or two carbon atoms (e.g. methyl chloride or methylene chloride) has been widely used as a solvent for cationic polymerization because, by using it particularly in combination with an aliphatic hydrocarbon, suitable dielectric constant can be provided to stabilize a growing chain end, and to give excellent solubility of the obtained polymer.

However, such a halogenated hydrocarbon having one or two carbon atoms has disadvantageous problems; e.g. it is difficult to handle therewith, and its discharge to the environment cannot be prevented in conventional treatment methods and involves use of a large apparatus or installation, thereby raising a problem of increased costs of manufacturing. For example, methylene chloride has high solubility in water of 2.0% (20° C.), and recovery or separation of methylene chloride dissolved in water also involves use of a large apparatus, leading to increased costs. Therefore, these halogenated hydrocarbons having one or two carbon atoms are disadvantageous solvents for use in a large scale polymerization such as in industrial production.

On the other hand, there has been an attempt to use singly a halogenated hydrocarbon having three or more carbon atoms as a cationic polymerization solvent for producing an isobutylene block copolymer. For example, Faust et al. have made an attempt of the production of an isobutylene block copolymer composed of an isobutylene polymer block and a styrene polymer block by using 1-chlorobutane (n-butyl chloride) as a polymerization solvent [J. Macromol. Sci-Pure Appl. Chem., A33(3), 305(1996)]. However since involves single use of a halogenated hydrocarbon, it is difficult to adjust the dielectric constant of the polymerization solvent system, so that the concentration of a Lewis acid or the like is limited for producing a good isobutylene block copolymer and the polymerization concentration cannot be raised due to insufficient solubility of the block copolymer.

The present invention has, in view of these circumstances, the object to provide a process for producing an isobutylene block copolymer giving good performance, by the use of a mixed solvent which has an advantage in industrial handling over prior art, in particular, over a halogenated hydrocarbon having one or two carbon atoms.

The isobutylene block copolymer obtained according to the present invention can have a narrow molecular weight distribution and a high ratio of block copolymer, which are as much as those obtained using the halogenated hydrocarbon having one or two carbon atoms.

SUMMARY OF THE INVENTION

The present invention provides a process for producing an isobutylene block copolymer, which comprises performing cationic polymerization of a monomer component containing isobutylene as a major monomer for a polymer block composed of isobutylene as a major monomer and a monomer component whose major monomer is not isobutylene for a polymer block in which major monomer is not isobutylene in the presence of a compound represented by the following general formula (1)

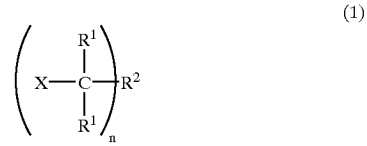

wherein plural $R^1$ are the same or different and represent a hydrogen atom or a monovalent hydrocarbon group having one to six carbon atoms; $R^2$ represents a monovalent or polyvalent aromatic hydrocarbon group or a monovalent or polyvalent aliphatic hydrocarbon group; X represents a halogen atom, an alkoxyl group having one to six carbon atoms, or an acyloxyl group having one to six carbon atoms; n is equal to a valence number of $R^2$ and represents an integer of one to six; and plural X may be the same or different if n is two or more:

wherein said polymerization is carried out in a mixed solvent containing a monohalogenated hydrocarbon solvent and a non-halogenated hydrocarbon solvent, said monohalogenated hydrocarbon solvent comprising a primary monohalogenated hydrocarbon having three to eight carbon atoms and/or a secondary monohalogenated hydrocarbon having three to eight carbon atoms, said non-halogenated hydrocarbon solvent comprising an aliphatic hydrocarbon and/or an aromatic hydrocarbon.

DETAILED DESCRIPTION OF INVENTION

According to the present invention, a mixed solvent of a monohalogenated hydrocarbon solvent containing a primary monohalogenated hydrocarbon having three to eight carbon atoms and/or a secondary monohalogenated hydrocarbon having three to eight carbon atoms, and a non-halogenated hydrocarbon solvent containing an aliphatic hydrocarbon and/or an aromatic hydrocarbon is used as a cationic polymerization solvent for producing an isobutylene block copolymer.

The inventors of the present invention have selected primary and/or secondary monohalogenated hydrocarbons having three to eight carbon atoms as a substitution for halogenated hydrocarbons having one or two carbon atoms used in the prior art processes because of the reasons such as follows.

(1) Tertiary halogenated hydrocarbons act as a polymerization initiator, causing side reactions by production of a tertiary cation from the solvent itself as well as the objective original initiation reaction, so that they are not preferable as a cationic polymerization solvent.

(2) The less the halogen content in the halogenated hydrocarbon (i.e. ratio of halogen weight in a molecule) is, the lower its solubility in water is and further the easier it is to decompose them. Also, if the halogenated hydrocarbon has two or less carbon atoms, the solubility in water is high, and hence it is not preferable. (The solubility in water is 2.0 wt % for methylene chloride, 0.869 wt % for 1,2-dichloroethane, 0.271 wt % for 1-chloropropane, 0.08 wt % for 1-chlorobutane, and 0.02 wt % for 1-chloropentane.)

(3) If the halogenated hydrocarbon has nine or more carbon atoms, its boiling point is high, so that a lot of energy is required in removing the solvent by distillation, thereby leading to increased costs.

(4) Monohalogenated hydrocarbons have a lower specific weight because their halogen content in a molecule is smaller than that of polyhalogenated hydrocarbons. Therefore, use of a monohalogenated hydrocarbon increase the specific weight difference between an organic phase and an aqueous phase in a water-washing step, making the separation easy.

The primary monohalogenated hydrocarbon having three to eight carbon atoms and the secondary monohalogenated hydrocarbon having three to eight carbon atoms to be used in the present invention are not specifically limited. Examples of such primary and secondary monohalogenated hydrocarbons having three to eight hydrocarbons include 1-chloropropane, 1-chloro-2-methylpropane, 1-chlorobutane, 1-chloro-2-methylbutane, 1-chloro-3-methylbutane, 1-chloro-2,2-dimethylbutane, 1-chloro-3,3-dimethylbutane, 1-chloro-2,3-dimethylbutane, 1-chloropentane, 1-chloro-2-methylpentane, 1-chloro-3-methylpentane, 1-chloro-4-methylpentane, 1-chlorohexane, 1-chloro-2-methylhexane, 1-chloro-3-methylhexane, 1-chloro-4-methylhexane, 1-chloro-5-methylhexane, 1-chloroheptane, 1-chlorooctane, 2-chloropropane, 2-chlorobutane, 2-chloropentane, 2-chlorohexane, 2-chloroheptane, 2-chlorooctane, and chlorobenzene. It is possible to use one of these alone or two or more of these in combination. For example, it is possible to use a monohalogenated solvent having three carbon atoms, a monohalogenated solvent having four carbon atoms, a combination of a monohalogenated solvent having three carbon atoms and a monohalogenated solvent having four carbon atoms, a combination of at least one of the monohalogenated hydrocarbons having four to eight carbon atoms, or the like. Among these, 1-chloropropane and/or 1-chlorobutane are preferably used in view of the solubility of the isobutylene block copolymer, the facility of decomposition, the balance of costs and others. Especially, 1-chlorobutane is preferable.

The non-halogenated aliphatic hydrocarbon and the non-halogenated aromatic hydrocarbon to be used in the present invention are not specifically limited. Examples of such non-halogenated aliphatic hydrocarbons and non-halogenated aromatic hydrocarbons include butane, pentane, neopentane, hexane, heptane, octane, cyclohexane, methylcyclohexane, ethylcyclohexane, benzene, toluene, xylene, ethylbenzene, and others. It is possible to use one of these alone or two or more of these in combination. In view of the balance among the solubility of the block copolymer, the costs, and the dielectric constant, it is preferable to use at least one selected from the group consisting of hexane, cyclohexane, methylcyclohexane, ethylcyclohexane, toluene, and xylene. Especially, it is preferable to use at least one selected from the group consisting of hexane, methylcyclohexane, and ethylcyclohexane.

The polymerization solvent to be used in the present invention is a mixed solvent which is a combination of a monohalogenated hydrocarbon solvent containing a primary monohalogenated hydrocarbon having three to eight carbon atoms and/or a secondary monohalogenated hydrocarbon having three to eight carbon atoms, and a non-halogenated hydrocarbon solvent containing an aliphatic hydrocarbon and/or an aromatic hydrocarbon as mentioned above. The content of the monohalogenated hydrocarbon solvent in the mixed solvent is not specifically limited, and may be set so as to obtain dielectric constant of the solvent or solubility of the block copolymer as desired. However, the content of the monohalogenated hydrocarbon solvent is typically 10 to 98 wt %, preferably 20 to 90 wt %.

The amount of the mixed solvent to be used is determined so that the concentration of the polymer is 1 to 50 wt %, preferably 5 to 35 wt %, taking into account the viscosity of the polymer solution to be obtained and the facility in removing the heat.

The monomer component whose major monomer is not isobutylene according to the present invention, which component is for a polymer block whose major monomer is not isobutylene, refers to a monomer component having an isobutylene content of not more than 30 wt %. The isobutylene content in the monomer component whose major monomer is not isobutylene is preferably not more than 10 wt %, more preferably not more than 3 wt %.

The monomers other than isobutylene in the monomer component whose major monomer is not isobutylene according to the present invention is not specifically limited as long as it is a monomer capable of undergoing cationic polymerization. Examples of such monomers include aliphatic olefins, aromatic vinyls, dienes, vinyl ethers, silanes, vinylcarbazole, β-pinene, acenaphthylene, and others. It is possible to use one of these alone or two or more of these in combination.

The aliphatic olefin monomer to be used in the present invention is not specifically limited. Examples of such aliphatic olefin monomers include ethylene, propylene, 1-butene, 2-methyl-1-butene, 3-methyl-1-butene, pentene, hexene, cyclohexene, 4-methyl-1-pentene, vinylcyclohexene, octene, norbornene, and others.

The aromatic vinyl monomer to be used in the present invention is not specifically limited. Examples of such aromatic vinyl monomers include styrene, o-, m-, or p-methylstyrene, α-methylstyrene, β-methylstyrene, 2,6-dimethylstyrene, 2,4-dimethylstyrene, α-methyl-o-methylstyrene, α-methyl-m-methylstyrene, α-methyl-p-methylstyrene, β-methyl-o-methylstyrene, β-methyl-m-methylstyrene, β-methyl-p-methylstyrene, 2,4,6-trimethylstyrene, α-methyl-2,6-dimethylstyrene α-methyl-2,4-dimethylstyrene, β-methyl-2,6-dimethylstyrene, β-methyl-2,4-dimethylstyrene, o-, m-, or p-chlorostyrene, 2,6-dichlorostyrene,2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6- trichlorostyrene, α-chloro-2,6-dichlorostyrene, α-chloro-2, 4-dichlorostyrene, β-chloro-2,6-dichlorostyrene, β-chloro-2,4-dichlorostyrene, o-, m-, or p-t-butylstyrene, o-, m-, or p-methoxystyrene, o-, m-, or p-chloromethylstyrene, o-, m-, or p-bromomethylstyrene, styrene derivatives substituted with a silyl group, indene, vinylnaphthalene, and others.

The diene monomer to be used in the present invention is not specifically limited. Examples of such diene monomers include butadiene, isoprene, cyclopentadiene, cyclohexadiene, dicyclopentadiene, divinylbenzene, ethylidenenorbornene, and others.

The vinyl ether monomer to be used in the present invention is not specifically limited. Examples of such vinyl ether monomers include methyl vinyl ether, ethyl vinyl ether, (n-, iso)propyl vinyl ether, (n-, sec-, tert-, iso)butyl vinyl ether, methyl propenyl ether, ethyl propenyl ether, and others.

The silane compound to be used in the present invention is not specifically limited. Examples of such silane compounds include vinyltrichlorosilane, vinylmethyldichlorosilane, vinyldimethylchlorosilane, vinyldimethylmethoxysilane, vinyltrimethylsilane, divinyldichlorosilane, divinyldimethoxysilane, divinyldimethylsilane, 1,3-divinyl-1,1,3,3-tetramethyldisiloxane, trivinylmethylsilane, γ-methacryloyloxypropyltrimethoxysilane, γ-methacryloyloxypropylmethyldimethoxysilane, and others The monomer component whose major monomer is not isobutylene according to the present invention is preferably a monomer component containing an aromatic vinyl monomer as a major monomer in view of the balance among the physical properties, the polymerization characteristics, and others. The monomer component containing an aromatic vinyl monomer as a major monomer according to the present invention refers to a monomer component having an aromatic vinyl monomer content of not less than 60 wt %, preferably not less than 80 wt %. Here, the aromatic vinyl monomer is preferably at least one selected from the group consisting of styrene, α-methylstyrene, p-methylstyrene, and indene. In view of the costs, it is particularly preferable to use styrene, α-methylstyrene, or a mixture of these.

The monomer component containing isobutylene as a major monomer according to the present invention, which component is for a polymer block composed of isobutylene as a major monomer, may or may not contain a monomer other than isobutylene, and is a monomer component containing typically not less than 60 wt %, preferably not less than 80 wt %, of isobutylene. The monomers other than isobutylene are not specifically limited as long as they are monomers capable of undergoing cationic polymerization. For example, they may be the above-mentioned monomer and others.

The ratio of the polymer block composed of isobutylene as a major monomer and the polymer block whose major monomer is not isobutylene is not specifically limited. However, in view of various physical properties, the polymer block composed of isobutylene as a major monomer is preferably contained at 95 to 40 wt %, and the polymer block whose major monomer is not isobutylene is preferably contained at 5 to 60 wt %. In particular, the polymer block composed of isobutylene as a major monomer is more preferably contained at 85 to 50 wt %, and the polymer block whose major monomer is not isobutylene is preferably contained at 15 to 50 wt %.

The number-average molecular weight of the isobutylene block copolymer is not specifically limited. However, in view of the fluidity, the proccessability, and the physical properties, the number-average molecular weight of the isobutylene block copolymer is 30,000 to 500,000, more preferably 50,000 to 400,000. If the number-average molecular weight of the isobutylene block copolymer is lower than the above range, the mechanical properties are not likely to be sufficient. On the other hand, if it exceeds the above range, it is disadvantageous in view of the fluidity and the processability.

The compound represented by the above-mentioned general formula (1) acts as an initiator, and generates a carbon cation in the presence of a Lewis acid or the like, so that it is believed to act as an initiating point in cationic polymerization. In the formula (1), plural $R^1$ are the same or different and represent a hydrogen atom or a monovalent hydrocarbon group having one to six carbon atoms; $R^2$ represents a monovalent or polyvalent aromatic hydrocarbon group or a monovalent or polyvalent aliphatic hydrocarbon group; X represents a halogen atom an alkoxyl group having one to six carbon atoms, or an acyloxyl group having one to six carbon atoms; n is equal to a valence number of $R^2$ and is an integer of one to six; and plural X may be the same or different if n is two or more.

Examples of the compounds represented by the general formula (1) to be used in the present invention include (1-chloro-1-methylethyl)benzene $[C_6H_5C(CH_3)_2Cl]$, 1,4-bis(1-chloro-1-methylethyl)benzene $[1,4-Cl(CH_3)_2CC_6H_4C(CH_3)_2Cl]$, 1,3-bis(1-chloro-1-methylethyl)benzene $[1,3-Cl(CH_3)_2CC_6H_4C(CH_3)_2Cl]$, 1,3,5-tis(1-chloro-1-methylethyl)benzene $[1,3,5-(ClC(CH_3)_2)_3C_6H_3]$, 1,3-bis(1-chloro-1-methylethyl)-5-(tert-butyl)benzene $[1,3-(C(CH_3)_2Cl)_2-5-(C(CH_3)_3)C_6H_3]$, and others.

The especially preferable one among these is bis(1-chloro-1-methylethyl)benzene $[C_6H_4(C(CH_3)_2Cl)_2]$. [Here, bis(chloro-1-methylethyl)benzene is also referred to as bis (α-chloroisopropyl)benzene, bis(2-chloro-2-propyl) benzene, or dicumyl chloride].

Further, a Lewis acid catalyst may be allowed to coexist in producing the isobutylene block copolymer. Such Lewis acids may be those capable of being used in cationic polymerization, and examples thereof include metal halides such as $TiCl_4$, $TiBr_4$, $BCl_3$, $BF_3$, $BF_3 \cdot OEt_2$, $SnCl_4$, $SbCl_5$, $SbF_5$, $WCl_6$, $TaCl_5$, $VCl_5$, $FeCl_3$, $ZnBr_2$, $AlCl_3$, and $AlBr_3$, organic metal halides such as $Et_2AlCl$ and $EtAlCl_2$, and others. Above all, in view of the capability as a catalyst and the industrial availability, $TiCl_4$, $BCl_3$, and $SnCl_4$ are preferable. The amount of the Lewis acid to be used is not specifically limited, and it can be set in view of the polymerization properties of the monomer to be used, the polymerization concentration, or the like. Typically, the Lewis acid is used in an amount of 0.1 to 100 molar equivalent, preferably 1 to 60 molar equivalent, more preferably 10 to 40 molar equivalents relative to the compound represented by the general formula (1).

Further, an electron donor may be optionally allowed to coexist in producing the isobutylene block copolymer. The electron donor is believed to have an effect of stabilizing the growing carbon cations in cationic polymerization, whereby a polymer having a controlled structure with a narrow molecular weight distribution is produced by addition of the electron donor. The electron donor capable of being in the present invention is not specifically limited, and examples thereof include pyridines, amines, amides, sulfoxides, esters, metal compounds having an oxygen atom bonded to a metal atom, and others.

Specifically, there can be mentioned pyridine compounds such as 2,6-di-t-butylpyridine, 2-t-butylpyridine, 2,4,6-trimethylpyridine, 2,6-dimethylpyridine, 2-methylpyridine, pyridine; amine compounds such as diethylamine, trimethylamine, triethylamine, tributylamine, diethylamine, N,N-dimethylaniline, aniline; amide compounds such as N,N-dimethylformamide, N,N-dimethylacetamide, N,N-diethylacetamide; sulfoxide compounds such as dimethyl sulfoxide; ether compounds such as diethyl ether; ester compounds such as methyl acetate, ethyl acetate; phosphate compounds such as trimethyl phosphate, tributyl phosphate, triamide hexamethylphosphate; and oxygen-containing metal compounds such as tetraisopropyl titanate.

The amount of the electron donor used is preferably 1 to 8 molar equivalent relative to said compound of formula (1). More preferable is 1 to 6 molar equivalent relative to said compound of formula (1). If the amount is out of the range, the block copolymer may have a wide molecular weight distribution and/or a low ratio of block copolymer. Most preferable amount of the electron donor may vary depending on the solvent, the electron donor, their amount and the like. When the monohalogenated hydrocarbon-solvent contain four to eight carbon atoms, preferable range is 2 to 8 molar equivalent relative to said compound of formula (1). When the electron donor is amide compounds, the more preferable range is 1 to 6 molar equivalent, most preferably 2 to 5 molar equivalent relative to said compound of formula (1).

The amount of the components to be used may be suitably designed in accordance with the properties of the intended polymer. For example, the molecular weight of the polymer to be obtained can be controlled by the molar equivalent ratio among isobutylene and cation-polymerizable monomer other than isobutylene and the compound represented by the general formula (1). Typically, the molar equivalent ratio is set so that the number-average molecular weight of the block copolymer to be obtained is 20,000 to 500,000.

According to the present invention, the isobutylene block copolymer obtained has a narrow molecular weight distribution. The value thereof is preferably 1.5 or less, more preferably 1.4 or less. Such a molecular weight distribution (weight average molecular weight/number average molecular weight) is determined by 510-type GPC system from Waters (chloroform as eluant and flow rate of 1 ml/min) and is represented in terms of polystyrene-reduced value.

Furthermore, according to the present invention, the isobutylene block copolymer obtained has a high ratio of block copolymer. Said ratio of block copolymer means a ratio of the amount of the block copolymers to the total amount of the produce polymer obtained by the block copolymer preparation. Presumably, contaminates contained in the product polymer is isobutylene homopolymer, non-isobutylene homopolymer and so on. If said ratio is low, the product polymer may not attain excellent performances specific to the isobutylene block copolymer. The value thereof preferably 80% or more, more preferably 85% or more. Such a ratio of block copolymer is determined by fractionation based on the difference of solubility into the solvent. Specifically, the product polymer obtained by the block copolymer preparation is dissolved to methylethylketone to obtain insoluble matter. Then this insoluble matter is dissolved to hexane/ethanol (8/2) mixture to give other insoluble matter. This corresponds to isobutylene block copolymer. The above ratio of block copolymer is determined by the formula: (the amount of the isobutylene block copolymer)/(the amount of the product polymer obtained by the block copolymer preparation)×100%.

In carrying out the polymerization, the components are mixed under cooling for example, at a temperature not less than $-100°$ C. and less than $0°$ C. In obtaining a balance between the energy costs and the stability of the polymerization, the particularly preferable temperature range is $-80°$ C. to $-30°$ C.

The isobutylene block copolymer produced according to the process of the present invention is not specifically limited as long as it contains a polymer block composed of isobutylene as a major monomer and a polymer block composed of a monomer component whose major monomer is not isobutylene. For example, the isobutylene block copolymer may be any of a block copolymer having a straight-chain, branched, or star-shaped structure, a diblock copolymer, a triblock copolymer, a multi-block copolymer, and others. If the monomer component whose major monomer is not isobutylene is an aromatic vinyl monomer, a preferable block copolymer is, for example, a triblock copolymer of (a polymer block composed of the aromatic vinyl monomer as a major monomer)-(a polymer block composed of isobutylene as a major monomer)-(a polymer block composed of the aromatic vinyl monomer as a major monomer), a diblock copolymer of (a polymer block composed of the aromatic vinyl monomer as a major monomer)-(a polymer block composed of isobutylene as a major monomer), and a star block copolymer consisting of three or more arms of block copolymer comprising a polymer block composed of the aromatic vinyl monomer as a major monomer and a polymer block composed of isobutylene as a major monomer, or a mixture of two or more of these copolymers. Here, the star polymer refers to a polymer consisting of three or more straight chain polymers (i.e. arms) generally having almost the same length which are bonded, particularly, to one point, to be made up into a star-shaped form. For example, the star polymer is produced by use of an initiator having three or more initiation points.

Best Modes for Carrying Out the Invention

Hereafter, the present invention will be explained more specifically with reference to the embodiments thereof. However, the present invention is not limited by these examples, and may be suitably changed for reducing the invention into practice as long as the gist of the invention is not changed.

The molecular weight of each of the block copolymers shown in the Examples was measured by GPC system made by Nihon Waters K. K. (column: Shodex K-804 (polystyrene gel) made by Showa Denko K. K., mobile phase: chloroform). The number-average molecular weight is represented by conversion in terms of polystyrene.

EXAMPLE 1

A 500 mL reaction vessel equipped with a stirrer was charged with 87 mL of 1-chlorobutane (dried by molecular sieves), 93 mL of hexane (dried by molecular sieves), and 0.0878 g of p-dicumyl chloride. The reaction vessel was cooled to $-70°$ C., and then 0.0708 g of α-picoline (2-methylpyridine) and 32 mL of isobutylene were added. Further, 15 mL of titanium tetrachloride was added to start polymerization and the reaction was continued for two hours while stirring the solution at $-70°$ C. Thereafter, 13.5 mL of styrene was added into the reaction solution and, after the reaction was further continued for 30 minutes, tie reaction solution was put into a large amount of water to terminate the reaction.

The separation of the organic phase and the aqueous phase as visually observed showed good separation, and they were easily separated by a separatory funnel. After washing with water twice and confirming that the aqueous phase was neutral, the organic phase was poured into a large amount of methanol to precipitate a polymer, which was then vacuum-dried at 60° C. for 24 hours to give an isobutylene block copolymer.

A GPC analysis of the isobutylene block copolymer showed a number-average molecular weight of 88,000 and a molecular weight distribution of 1.14 The styrene content was 25 wt %.

EXAMPLE 2

The process was carried out in the same manner as in Example 1 except that 102 mL of 1-chlorobutane and 98 mL of methylcyclohexane (dried by molecular sieves) were used as the polymerization solvent. The separation of the organic phase and the aqueous phase at the time of water-washing was found to be good.

The number-average molecular weight of the obtained isobutylene block copolymer was 101,000 and the molecular weight distribution was 1.11. The styrene content was 28 wt %. The ratio of block copolymer in the obtained polymer (calculated by fractionation based on the difference of solubility into the solvent) was 98%.

EXAMPLE 3

The process was carried out in the same manner as in Example 1 except that 88 mL of 1-chloropropane (dried by molecular sieve) and 112 mL of methylcyclohexane were used as the polymerization solvent. The separation of the organic phase and the aqueous phase at the time of water-washing was found to be good. The obtained isobutylene block copolymer showed good rubber elasticity.

COMPARATIVE EXAMPLE 1

A 500 mL reaction vessel equipped with a stirrer was charged with 76 mL of methylene chloride (dried by molecular sieves), 114 mL of hexane (dried by molecular sieves), and 0.0876 g of p-dicumyl chloride. The reaction vessel was cooled to −70° C., and then 0.0357 g of α-picoline (2-methylpyridine) and 33 mL of isobutylene were added. Further, 15 mL of titanium tetrachloride was added to start polymerization and the reaction was continued for one hour while stirring the solution at −70° C. Thereafter, 13.5 mL of styrene was added into the reaction solution and, after the reaction was further continued for 10 minutes the reaction solution was put into a large amount of water to terminate the reaction.

The separation of the organic phase and the aqueous phase as visually observed showed poor separation, and a portion around the boundary of the organic phase and the aqueous phase was partly emulsified. It was difficult to separate them by a separatory funnel. After washing with water twice the aqueous phase was not yet neutral, so that it was treated with an aqueous solution of sodium hydrogencarbonate. Thereafter, the organic phase was poured into a large amount of methanol to precipitate a polymer, which was then vacuum-dried at 60° C. for 24 hours to give an isobutylene block copolymer.

A GPC analysis of the isobutylene block copolymer showed a number-average molecular weight of 102,000 and a molecular weight distribution of 1.20. The styrene content was 29 wt %. The ratio of block copolymer in the obtained polymer (calculated by fractionation based on the difference of solubility into the solvent) was 95%.

EXAMPLE 4

The process was carried out in the same manner as in Example 2 except that 0.989 g of α-picoline was used.

COMPARATIVE EXAMPLE 2

The process was carried out in the same manner as in Example 1 except that 0.018 g of α-picoline was used.

EXAMPLE 5

A two-liters reaction vessel equipped with a stirrer was charged with 690 mL of 1-chlorobutane (dried by molecular sieves), 662 mL of methylcyclohexane (dried by molecular sieves), and 0.252 g of p-dicumyl chloride. The reaction vessel was cooled to −70° C., and then 0.203 g of α-picoline (2-methylpyridine) and 68.1 g of isobutylene were added. Further, 8.7 mL of titanium tetrachloride was added to start polymerization and the reaction was continued for 180 minutes while stirring the solution at −70° C. Thereafter, 45.7 mL of styrene was added into the reaction solution and, after the reaction was further continued for 180 minutes, the reaction solution was put into a large amount of water to terminate the reaction.

The separation of the organic phase and the aqueous phase as visually observed showed good separation, and they were easily separated by a separatory funnel. After washing with water twice and confirming that the aqueous phase was neutral, the organic phase was poured into a large amount of methanol to precipitate a polymer, which was then vacuum-dried at 60° C. for 24 hours to give an isobutylene block copolymer.

EXAMPLE 6

The process was carried out in the same manner as in Example 5 except that 0.813 g of α-picoline was used.

COMPARATIVE EXAMPLE 3

The process was carried out in the same manner as in Example 5 except that 0.051 g of α-picoline was used.

EXAMPLE 7

A two-liters reaction vessel equipped with a stirrer was charged with 696 mL of 1-chlorobutane (dried by molecular sieves), 484 mL of hexane (dried by molecular sieves), and 0.809 g of p-dicumyl chloride. The reaction vessel was cooled to −70° C., and then 0.610 g of N,N-dimethylacetamide (DMAc) and 218.6 g of isobutylene were added. Further, 7.7 mL of titanium tetrachloride was added to start polymerization and the reaction was continued for 120 minutes while stirring the solution at −70° C. Thereafter, 117.2 mL of styrene was added into the reaction solution and, after the reaction was further continued for 80 minutes, the reaction solution was put into a large amount of water to terminate the reaction.

The separation of the organic phase and the aqueous phase as visually observed showed good separation, and they were easily separated by a separatory funnel. After washing with water twice and confirming that the aqueous phase was neutral, the organic phase was poured into a large amount of methanol to precipitate a polymer, which was then vacuum-dried at 60° C. for 24 hours to give an isobutylene block copolymer.

EXAMPLE 8

A two-liters reaction vessel equipped with a stirrer was charged with 691 mL of 1-chlorobutane (dried by molecular sieves), 480 mL of hexane (dried by molecular sieves), and 0.596 g of p-dicumyl chloride. The reaction vessel was cooled to −70° C., and then 0.674 g of NpNdimethylacetamide (DMAc) and 161.1 g of isobutylene were added. Further, 8.7 mL of titanium tetrachloride was added to start polymerization and the reaction was continued for 120 minutes while stirring the solution at −70° C. Thereafter, 86.4 mL of styrene was added into the reaction solution and, after the reaction was further continued for 80 minutes, the reaction solution was put into a large amount of water to terminate the reaction.

The separation of the organic phase and the aqueous phase as visually observed showed good separation, and they were easily separated by a separatory funnel. After washing with water twice and confirming that the aqueous phase was neutral, the organic phase was poured into a large amount of methanol to precipitate a polymer, which was then vacuum-dried at 60° C. for 24 hours to give an isobutylene block copolymer.

EXAMPLE 9

The process was carried out in the same manner as in Example 8 except that 1.12 g of DMAc was used and that the reaction was continued for 90 minutes before the addition of styrene, and for 60 minutes thereafter.

COMPARATIVE EXAMPLE 4

The process was carried out in the same manner as in Example 9 except that 0.11 g of DMAc was used.

COMPARATIVE EXAMPLE 5

The process was carried out in the same manner as in Example 9 except that 2.20 g of DMAc was used.

The results of Examples 1–9 and Comparative Example 1–4 are summarized in Table 1.

TABLE 1

|  | Solvent | ECR | LCR | MWD | RBC |
|---|---|---|---|---|---|
| Ex 1 | 1-Chlorobutane + Hexane | 2 | 36 | 1.14 | — |
| Ex 2 | 1-Chlorobutane + Methylcyclohexane | 2 | 36 | — | 98 |
| Ex 3 | 1-Chloropropane + Methylcyclohexane | 2 | 36 | — | — |
| Ex 4 | 1-Chlorobutane + Methylcyclohexane | 8 | 36 | 1.13 | 93 |
| Ex 5 | 1-Chlorobutane + Methylcyclohexane | 2 | 72 | 1.36 | 98 |
| Ex 6 | 1-Chlorobutane + Methylcyclohexane | 8 | 72 | 1.16 | 92 |
| Ex 7 | 1-Chlorobutane + Hexane | 2 | 20 | 1.35 | 90 |
| Ex 8 | 1-Chlorobutane + Hexane | 3 | 31 | 1.31 | 90 |
| Ex 9 | 1-Chlorobutane + Hexane | 5 | 31 | 1.19 | 94 |
| Comp Ex 1 | Methylene Chloride + Hexane | 1 | 36 | 1.20 | 95 |
| Comp Ex 2 | 1-Chlorobutane + Hexane | 0.5 | 36 | 2.50 | 54 |
| Comp Ex 3 | 1-Chlorobutane + Methylcyclohexane | 0.5 | 72 | 2.29 | 87 |
| Comp Ex 4 | 1-Chlorobutane + Hexane | 0.5 | 31 | 1.66 | 86 |
| Comp Ex 5 | 1-Chlorobutane + Hexane | 10 | 31 | 1.30 | 51 |

ECR: Electron Donor/Compound of Formula (1) (molar ratio)
LCR: Lewis Acid/Compound of Formula (1) (molar ratio)
MWD: Molecular Weight Distribution
RBC: Ratio of Block Copolymer (%)

As shown above, it will be understood that the polymerization using a mixed solvent of the present invention produces a good isobutylene block copolymer having a narrow molecular weight distribution and a high ratio of block copolymer. Also, since the monohalogenated hydrocarbon used in the present invention has a low solubility in water, water-washing can be carried out easily in the post-processing step. If a halogenated hydrocarbon having one or two carbon atoms was used (methylene chloride was used in Comparative Example 1) as in the prior art, the separation of the organic phase and the aqueous phase is poor because of the high solubility in water, thereby lowering the workability of the water-washing step. Also, the molecular weight distribution of the obtained isobutylene block copolymer is as much as that obtained when the polymerization solvent of the present invention is used, so that it is disadvantageous in this respect as well.

Industrial Applicability

Since the present invention is constructed as shown above, it is more advantageous in industrial handling as compared with the use of halogenated hydrocarbons having one or two carbon atoms as the polymerization solvent, and the isobutylene block copolymer obtained is excellent in properties.

Since the solvent to be used in the present invention has low solubility in water, the workability in the water-washing step after the polymerization will be improved. Also, the low solubility in water means that the effluent treatment after the water-washing step can be carried out comparatively easily. These provide advantages particularly in carrying out a large-scale polymerization such as industrial production.

Furthermore, according to the production process of the present invention, it is possible to obtain an isobutylene block copolymer giving good performances such as a narrow molecular weight distribution and a high ratio of block copolymers The values of said molecular weight distribution and said ratio of block copolymer is as much as those obtained using the halogenated hydrocarbon having one or two carbon atoms.

What is claimed is:

1. A process for producing an isobutylene block copolymer, which comprises performing cationic polymerization of a monomer component containing isobutylene as a major monomer component for a polymer block composed of isobutylene as a major monomer and a monomer component whose major monomer is not isobutylene for a polymer block in which major monomer is not isobutylene in the presence of a Lewis Acid selected from the group consisting of TiCl$_4$, BCl$_3$ and mixtures thereof, an electron donor selected from the group consisting of a pyridine, an amide, an ester and a metal compound having an oxygen atom bonded to a metal atom and a compound represented by the following general formula (1)

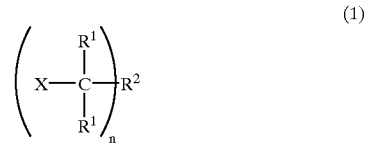

wherein plural R$^1$ are the same or different and represent a hydrogen atom or a monovalent hydrocarbon group having one to six carbon atoms; R$^2$ represents a monovalent or polyvalent aromatic hydrocarbon group or a monovalent or polyvalent aliphatic hydrocarbon group; X represents a halogen atom, an alkoxyl group having one to six carbon atoms, or an acyloxyl group having one to six carbon atoms; n is equal to a valence number of $R^2$ and represents an integer of one to six; and plural X may be the same or different if n is two or more:

wherein said polymerization is carried out in a mixed solvent containing a monohalogenated hydrocarbon solvent and a non-halogenated hydrocarbon solvent, said monohalogenated hydrocarbon solvent comprising a primary monohalogenated hydrocarbon having three to eight carbon atoms and/or a secondary monohalogenated hydrocarbon having three to eight carbon atoms, said non-halogenated hydrocarbon solvent comprising an aliphatic hydrocarbon and/or an aromatic hydrocarbon.

2. The process according to claim 1, wherein said monohalogenated hydrocarbon solvent is at least one member selected from the group consisting of 1-chloropropane, 1-chloro-2-methylpropane, 1-chlorobutane, 1-chloro-2-methylbutane, 1-chloro-3-methylbutane, 1-chloro-2,2-dimethylbutane, 1-chloro-3,3-dimethylbutane, 1-chloro-2,3-dimethylbutane, 1-chloropentane, 1-chloro-2-methylpentane, 1-chloro-3-methylpentane, 1-chloro-4-methylpentane, 1-chlorohexane, 1-chloro-2-methylhexane, 1-chloro-3-methylhexane, 1-chloro-4-methylhexane, 1-chloro-5-methylhexane, 1-chloroheptane, 1-chlorooctane, 2-chloropropane, 2-chlorobutane, 2-chloropentane, 2-chlorohexane, 2-chloroheptane, 2-chlorooctane and chlorobenzene.

3. The process according to claim 2, wherein said monohalogenated hydrocarbon solvent is at least one member selected from the group consisting of 1-chloropropane and 1-chlorobutane.

4. The process according to claim 3, wherein said compound represented by the general formula (1) is bis(1-chloro-1-methylethyl)benzene $[C_6H_4(C(CH_3)_2Cl)_2]$.

5. The process according to claim 3, wherein said monohalogenated hydrocarbon solvent is 1-chlorobutane.

6. The process according to claim 5, wherein said compound represented by the general formula (1) is bis(1-chloro-1-methylethyl)benzene $[C_6H_4(C(CH_3)_2Cl)_2]$.

7. The process according to claim 5, wherein said non-halogenated hydrocarbon solvent is at least one member selected from the group consisting of butane, pentane, neopentane, hexane, heptane, octane, cyclohexane, methylcyclohexane, ethylcyclohexane, benzene, toluene, xylene and ethylbenzene.

8. The process according to any one of claim 1, wherein said non-halogenated hydrocarbon solvent is at least one member selected from the group consisting of butane, pentane, neopentane, hexane, heptane, octane, cyclohexane, methylcyclohexane, ethylcyclohexane, benzene, toluene, xylene and ethylbenzene.

9. The process according to claim 8, wherein said compound represented by the general formula (1) is bis(1-chloro-1-methylethyl)benzene $[C_6H_4(C(CH_3)_2Cl)_2]$.

10. The process according to claim 5, wherein said non-halogenated hydrocarbon solvent is at least one member selected from the group consisting of hexane, cyclohexane, methylcyclohexane, ethylcyclohexane, toluene and xylene.

11. The process according to claim 10, wherein said compound represented by the general formula (1) is bis(1-chloro-1-methylethyl)benzene $[C_6H_4(C(CH_3)_2Cl)_2]$.

12. The process according to claim 10, wherein said non-halogenated hydrocarbon solvent is at least one member selected from the group consisting of hexane, methylcyclohexane and ethylcyclohexane.

13. The process according to claim 12, wherein said compound represented by the general formula (1) is bis(1-chloro-1-methylethyl)benzene $[C_6H_4(C(CH_3)_2Cl)_2]$.

14. The process according to any one of claim 1, wherein said compound represented by the general formula (1) is bis(1-chloro-1-methylethyl)benzene $[C_6H_4(C(CH_3)_2Cl)_2]$.

15. The process according to any one of claim 1, wherein said monomer component whose major monomer is not isobutylene is a monomer component containing an aromatic vinyl monomer as a major monomer.

16. The process according to claim 15, wherein said aromatic vinyl monomer is at least one member selected from the group consisting of styrene, p-methylstyrene, α-methylstyrene and indene.

17. The process according to claim 15, wherein said isobutylene block copolymer is at least one member selected from the group consisting of a triblock copolymer of (a polymer block composed of the aromatic vinyl monomer as a major monomer)-(a polymer block composed of isobutylene as a major monomer)-(a polymer block composed of the aromatic vinyl monomer as a major monomer), a diblock copolymer of (a polymer block composed of the aromatic vinyl monomer as a major monomer)-(a polymer block composed of isobutylene as a major monomer), and a star block copolymer consisting of three or more arms of block copolymers comprising a polymer block composed of the aromatic vinyl monomer as a major monomer and a polymer block composed of isobutylene as a major monomer.

18. The process according to claim 2, wherein said non-halogenated hydrocarbon solvent is at least one member selected from the group consisting of butane, pentane, neopentane, hexane, heptane, octane, cyclohexane, methylcyclohexane, ethylcyclohexane, benzene, toluene, xylene and ethylbenzene.

19. The process according to claim 3, wherein said non-halogenated hydrocarbon solvent is at least one member selected from the group consisting of butane, pentane, neopentane, hexane, heptane, octane, cyclohexane, methylcyclohexane, ethylcyclohexane, benzene, toluene, xylene and ethylbenzene.

20. The process according to claim 2, wherein said compound represented by the general formula (1) is bis(1-chloro-1-methylethyl)benzene $[C_6H_4(C(CH_3)_2Cl)_2]$.

* * * * *